United States Patent
Park

[11] Patent Number: 5,899,579
[45] Date of Patent: * May 4, 1999

[54] METHOD FOR REPRODUCING COMPRESSION-ENCODED VIDEO DATA

[75] Inventor: Pan-Gie Park, Ahnsan, Rep. of Korea

[73] Assignee: Samsung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/735,406

[22] Filed: Oct. 22, 1996

[30] Foreign Application Priority Data

Oct. 25, 1995 [KR] Rep. of Korea .................. 1995 37067

[51] Int. Cl.⁶ ...................................................... H04N 5/91
[52] U.S. Cl. ................................ 386/94; 386/45; 386/125
[58] Field of Search ............................... 386/46, 95, 109, 386/112, 124; 360/27, 48; H04N 5/76, 5/31

[56] References Cited

U.S. PATENT DOCUMENTS

| | | | |
|---|---|---|---|
| 4,930,158 | 5/1990 | Vogel | 380/5 |
| 5,172,111 | 12/1992 | Olivio, Jr. | 360/27 |
| 5,214,556 | 5/1993 | Kilbel | 360/27 |
| 5,574,567 | 11/1996 | Cookson et al. | 386/46 |

FOREIGN PATENT DOCUMENTS

| | | | |
|---|---|---|---|
| 0 645 765 | 3/1995 | European Pat. Off. | G11B 7/00 |
| 0 676 895 | 10/1995 | European Pat. Off. | H04N 5/926 |
| 2 209 427 | 5/1989 | United Kingdom | G11B 15/087 |

OTHER PUBLICATIONS

Grand Alliance HDTV System Specification, Version 2.0, Chapter–5, pp. 1–54, Dec. 7, 1994.

*Primary Examiner*—Wendy Garber
*Assistant Examiner*—Vincent F. Boccio
*Attorney, Agent, or Firm*—Sughrue, Mion, Zinn, Macpeak & Seas, PLLC

[57] ABSTRACT

A method for reproducing compression-encoded video data of an MPEG format by: selecting a user level and a multiplexing level as one level among several levels according to kinds of video data for a sequence and GOP (group of picture) unit to be set as a reproducing level for the user data of the MPEG specification when the video data is compression-encoded according to the MPEG specification; checking whether the reproducing level is set in the user data for sequence in the compression-encoded video data; comparing the user level and the multiplexing level of the reproducing level with an assigned level input by a user corresponding to one of the plurality of levels when the reproducing level is set in the corresponding sequence; halting decoding when the assigned level is not suitable for the reproducing level; checking whether the reproducing level is set in the user data for GOP of the corresponding sequence when the reproducing level is not set in the corresponding sequence or the assigned level is suitable for the reproducing level of the corresponding sequence; comparing the reproducing level with the assigned level when the reproducing level is set in the corresponding GOP; decoding the corresponding GOP when the reproducing level is not set in the corresponding GOP or the assigned level is suitable for the reproducing level of the corresponding GOP; and skipping the corresponding GOP without decoding when the assigned level is not suitable for the reproducing level of the corresponding GOP.

6 Claims, 5 Drawing Sheets

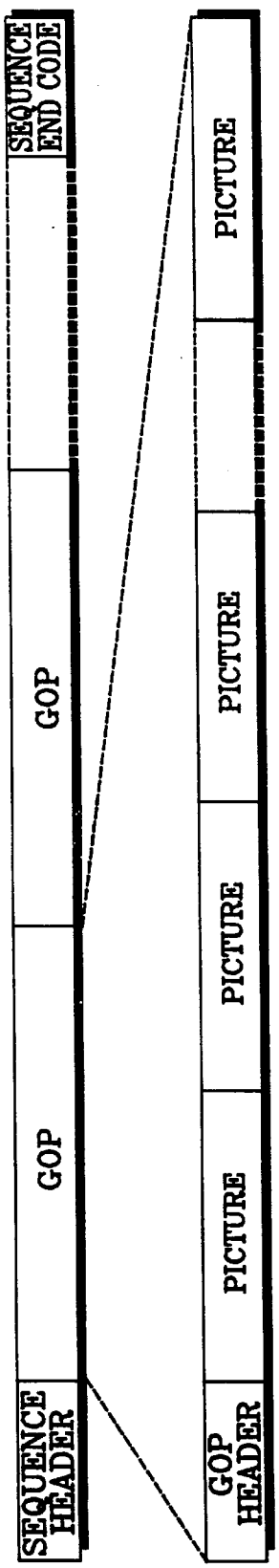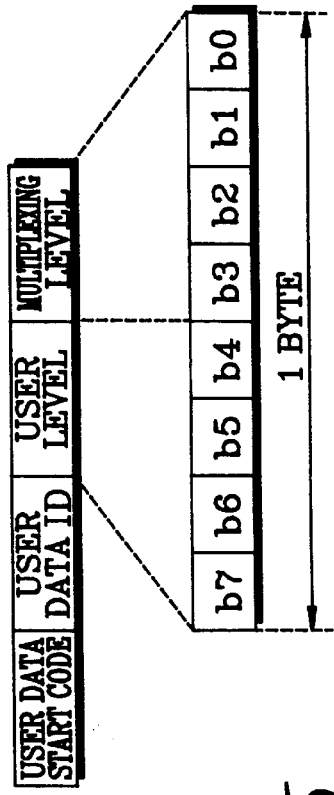
Fig. 1 PRIOR ART
Fig. 2 PRIOR ART
Fig. 5

METHOD FOR REPRODUCING COMPRESSION-ENCODED VIDEO DATA

BACKGROUND OF THE INVENTION

1. Field of the Invention

The present invention relates to a method for reproducing compression-encoded video data, and more particularly, to a method for reproducing encoded video data by decoding video data which is compression-encoded according to an MPEG (moving picture experts group) specification.

The present application for a method for reproducing compression-encoded video data is based on Korean Application No. 37067/1995.

2. Description of the Related Art

In general, the MPEG specification is an international specification for image-compression technology, providing a compression algorithm to video data. The specification is widely used in reproducing apparatus using an optical disk, an optomagnetic disk or a DVCR (digital video cassette recorder) tape and a network such as an ATM (asynchronous transfer mode). The MPEG image compression algorithm fundamentally consists of DCT (discrete cosine transform), quantization, variable length coding, and motion compensation. Information is arranged in a bit string to be transmitted while being compressed to a six level hierarchial structure according to certain sequences and rules. A GOP (group of picture) layer, which is a basic unit for random access of an image, is present under a sequence layer which is the uppermost layer. A picture layer is present under the GOP layer. Each picture is composed of slice layers, and each slice is composed of macroblock layers, which is a basic unit for motion compensation. The macroblock is composed of block layers which is a basic unit for DCT processing.

The format of such MPEG video data is illustrated in FIG. 1 which schematically shows the picture layer with respect to one sequence. The largest data unit in the MPEG video data is a sequence. Generally, a single sequence encompasses the entire film. Alternatively, a plurality of sequences, separated based on story content, constitutes one film. As shown in FIG. 1, each sequence consists of a sequence header and at least one GOP, and one GOP is made up of at least one picture. The sequence header includes various kinds of information commonly applied to the entire sequence, i.e., a size in a horizontal direction, a size in a vertical direction, bit rate and picture rate. Also, the sequence header may include user data starting with a user data start code, as shown in FIG. 2. The GOP is a group which is composed of the GOP header and the pictures. As shown in FIG. 2, the user data starting with the user data start code can be additionally included. Also, the sequence header starts with a sequence header code and the GOP header starts with a group start code. The picture header starts with a picture start code and the sequence ends with a sequence end code. Though defined for use in the MPEG specification, the user data is not actually being used since its specific usage and parameters are not defined.

FIG. 3 illustrates a decoder which is commonly employed to reproduce compression-encoded video data according to the MPEG specification. The decoder comprises a data input buffer 300 for buffering input compression-encoded video data to the MPEG, a variable length decoder (VLD) 302 for performing variable length decoding with respect to the bufferred video data, an inverse-quantizing portion 304 for inverse-quantizing the variable-length-decoded data, an inverse DCT (IDCT) 306 for performing inverse-DCT with respect to the inverse-quantized data, a motion compensation portion 308 for providing compensation in accordance with motion compensation information, a frame buffer 310 for storing the decoded data, a switching portion 312 for controlling the motion compensation and a digital video output, and a micro processor unit (MPU) 314 for controlling the entire decoder.

The MPEG video data as shown in FIG. 1 is decoded by a processing sequence as shown in the flow chart of FIG. 4. The MPEG video data to be decoded is input to the data input buffer 300 of FIG. 3 and passes via the VLD 302 while information necessary for decoding is interpreted by the MPU 314. Based upon such information, the MPU 314 controls the decoder for decoding the MPEG video data.

More specifically, the MPU 314 of FIG. 3 starts decoding a GOP unit after obtaining necessary information by interpreting a sequence header, which is the first step 400 of the video processing sequence of FIG. 4. Subsequently, the MPU 314 interprets the GOP header in a step 402 and performs decoding with respect to each picture in steps 404 and 406.

In the decoding of a picture unit, the data input to the data input buffer 300 passes the VLD 302 and the variable-length-coded data is decoded. After the output of the VLD 302 is rearranged by a block unit, inverse-quantization is performed in the inverse-quantizing portion 304, and the inverse-quantized data passes the IDCT portion 306 while the inverse-DCT is performed. After the data passes through these processes, the picture data having moving information proceeds to the motion compensation step in motion compensation portion 308. If the data has no information for the motion compensation, decoding ends and the picture is output without further processing. The motion compensation is achieved while the MPU 314 controls the switching portion 312 according to the determination of whether the output of the frame buffer 310 is transmitted as a digital video output or used in performing motion compensation in the motion compensation portion 308.

After decoding one picture as mentioned above, the MPU 314 determines whether the next data is the picture start code, and if so, continuously repeats decoding on successive picture units. If the next data is not the picture start code, it is determined whether the next data is the group start code in a step 408. If the data is determined to be the group start code, decoding with respect to the GOP in steps 402 through 406 continues. If the next data is not the group start code, this indicates that the sequence header may be present. A check for the sequence header is performed in a step 410. If the sequence header code is detected, the sequence decoding of the steps 400 through 408 repeats as described above, and if not, it is confirmed whether the sequence end code is generated in a step 412 to end the decoding process.

In the above data structure, when video data having various contents for interaction with a user is being multiplexed, the multiplexing is performed on the basis of a sequence unit. In other words, to continuously reproduce the separate fragments of the story of one MPEG video data, which varies according to the user's selection, it should be possible to use video data of various contents for multiplexing. In the conventional technology as described above, the multiplexing is performed based on the sequence unit as the story is divided by this unit. It is generally known that a part of one sequence is used for multiplexing according to the content of the story. The implementation of multiplexing by content in this manner has been difficult because a large amount of data is required, resulting in a considerable waste of a recording or transmitting medium. In addition, it is difficult to skip the reproduction of a particular portion of the video based on the suitability of the contents for a user based on the user's age or other characteristics. It has not yet been suggested to implement such multiplexing and user programming functions without deviating from the MPEG specification.

SUMMARY OF THE INVENTION

To overcome the above problems, it is an object of the present invention to provide a method which enables a user to limit reproduction of portions of video data in a sequence unit.

It is another object of the present invention to provide a reproducing method by which the increments of data are minimized, and multiplexing based on smaller data increments is possible.

It is yet another object of the present invention to provide a reproducing method which enables a user to limit reproduction of a portion of the video data and to maintain compatibility with the MPEG specification in multiplexing.

To achieve the above objects, there is provided a method for reproducing compression-encoded video data of an MPEG specification comprising the steps of: selecting a user level and a multiplexing level as one level from a plurality of levels according to kinds of video data for sequence and GOP (group of picture) units, wherein the user level and multiplexing level can be set as a reproducing level for the user data of the MPEG specification when the video data is compression-encoded according to the MPEG specification; checking whether the reproducing level is set in the user data for each sequence in the compression-encoded video data; comparing the reproducing level with the user level and the multiplexing level of an assigned level input which is input by a user when the reproducing level is set in the corresponding sequence, said assigned level corresponding to one of a plurality of levels; halting decoding when the assigned level is not suitable for the reproducing level; checking whether the reproducing level is set in the user data for each GOP of the corresponding sequence when the reproducing level is not set in the corresponding sequence or the assigned level is suitable for the reproducing level of the corresponding sequence; comparing the reproducing level with the assigned level when the reproducing level is set in the corresponding GOP; decoding the corresponding GOP when the reproducing level is not set in the corresponding GOP or the assigned level is suitable for the reproducing level of the corresponding GOP; and skipping the corresponding GOP without decoding when the assigned level is not suitable for the reproducing level of the corresponding GOP.

In the present invention, it is preferable that the reproducing level is set with any one of the user levels which are values for determining reproduction according to user characteristics, and the multiplexing level is a value for indicating a story change in the video data.

BRIEF DESCRIPTION OF THE DRAWINGS

FIG. 1 is a view showing a format of general MPEG video data;

FIG. 2 is a view showing a format of general MPEG user data;

FIG. 5 is a view showing a format of MPEG user data according to the present invention.

DETAILED DESCRIPTION OF THE PREFERRED EMBODIMENT

Figure 3:
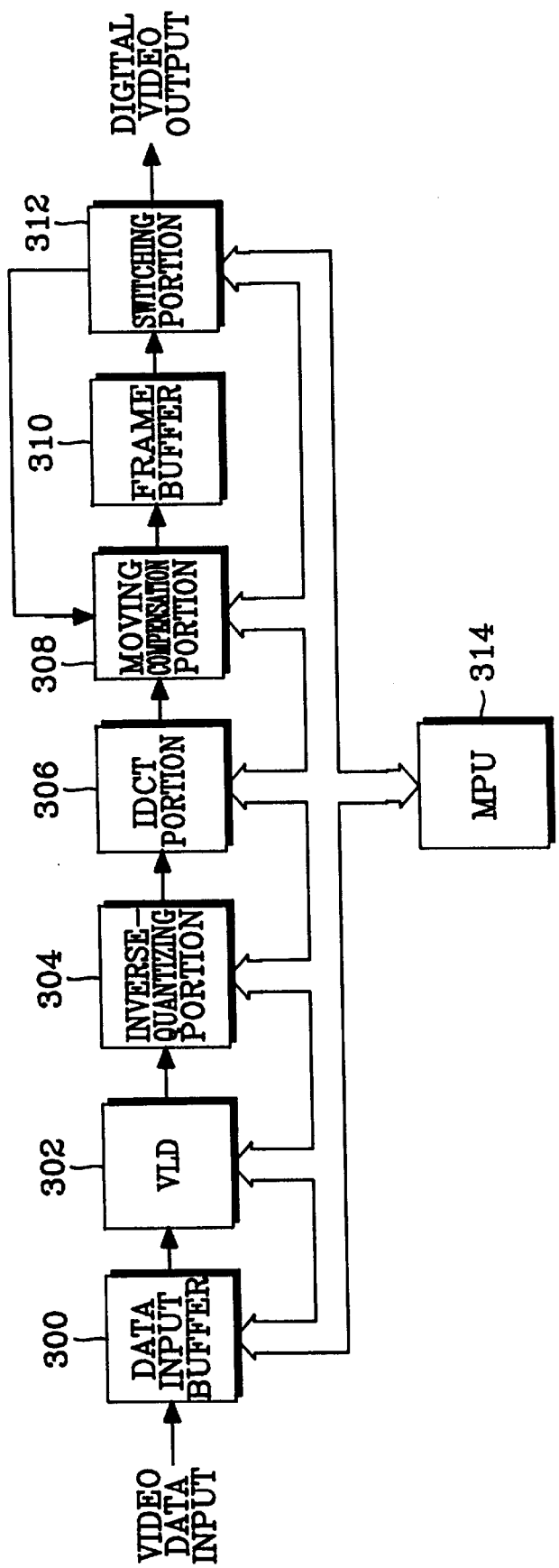
FIG. 3 is a block diagram of a typical MPEG video data decoder.

The user data, as shown in FIG. 2 and defined by the MPEG specification, is used in the present invention. The start of the user data can be recognized in a general MPEG decoder by using it as the user data start code defined by the MPEG. Then, various kinds of user data are classified by providing user data identification (ID). When video data is compression-encoded according to the MPEG specification, the selection of one of several levels, according to the kind of video data contained in the sequence and GOP units, is set as the user data of the MPEG specification as a reproducing level. The reproducing level is configured into 1 byte as shown in FIG. 5. The upper 4 bits indicate a user level, and the lower 4 bits indicate a multiplexing level. Accordingly, each of the user level and the multiplexing levels can have a maximum of 16 levels.

In the exemplary case, the user level is classified into 15 levels according to the kind of video data and indicates information to be reproduced. For instance, the user level can be classified into levels 1 through 6 for kids under 7, children under 12, boys under 15, high school students, college students and adults, respectively, in accordance with the content of video data. In other words, if a user corresponds to a user level 5, the user levels 1–5 can be reproduced, and the video data corresponding to user level 6 will be skipped. When the data has no user level limitation, the user level can be assigned to "0" as a default.

Similarly, using the multiplexing level enables multiplexing of the MPEG video data with a comparatively less amount of data. Assume that there are 15 kinds of MPEG video data based on video content, and the first multiplexing level is 0 where multiplexing is not performed to the data. At a point in the video data where the story content changes, the portion has a different multiplexing level. If a single multiplexing level is given, the reproduction is made when the user multiplexing level is the same as the reproducing multiplexing level, thereby implementing the multiplexing for a varying story. When the multiplexing level is set to "0," there will be no limit on reproduction based on the multiplexing level.

In a format of FIG. 5, for example, when "b7 b6 b5 b4, b3 b2 b1 b0" are "0000, 0000," there are no sets for the user level and the multiplexing level. When the bits b7–b0 are "0000, XXXX," only the multiplexing level is set to a certain level. When b7–b0 are "XXXX, 0000," only the user level is set to a certain level. When b7–b0 are "XXXX, XXXX," both the user level and the multiplexing level are set to a certain level. The "X" corresponds to either "0" or "1".

As mentioned above, decoding with respect to the MPEG compression-encoded video data by selecting the reproducing level is achieved in the decoder of FIG. 3 following a flow chart (see FIG. 6) of the decoding method of MPEG video data according to the present invention.

Figure 6A:
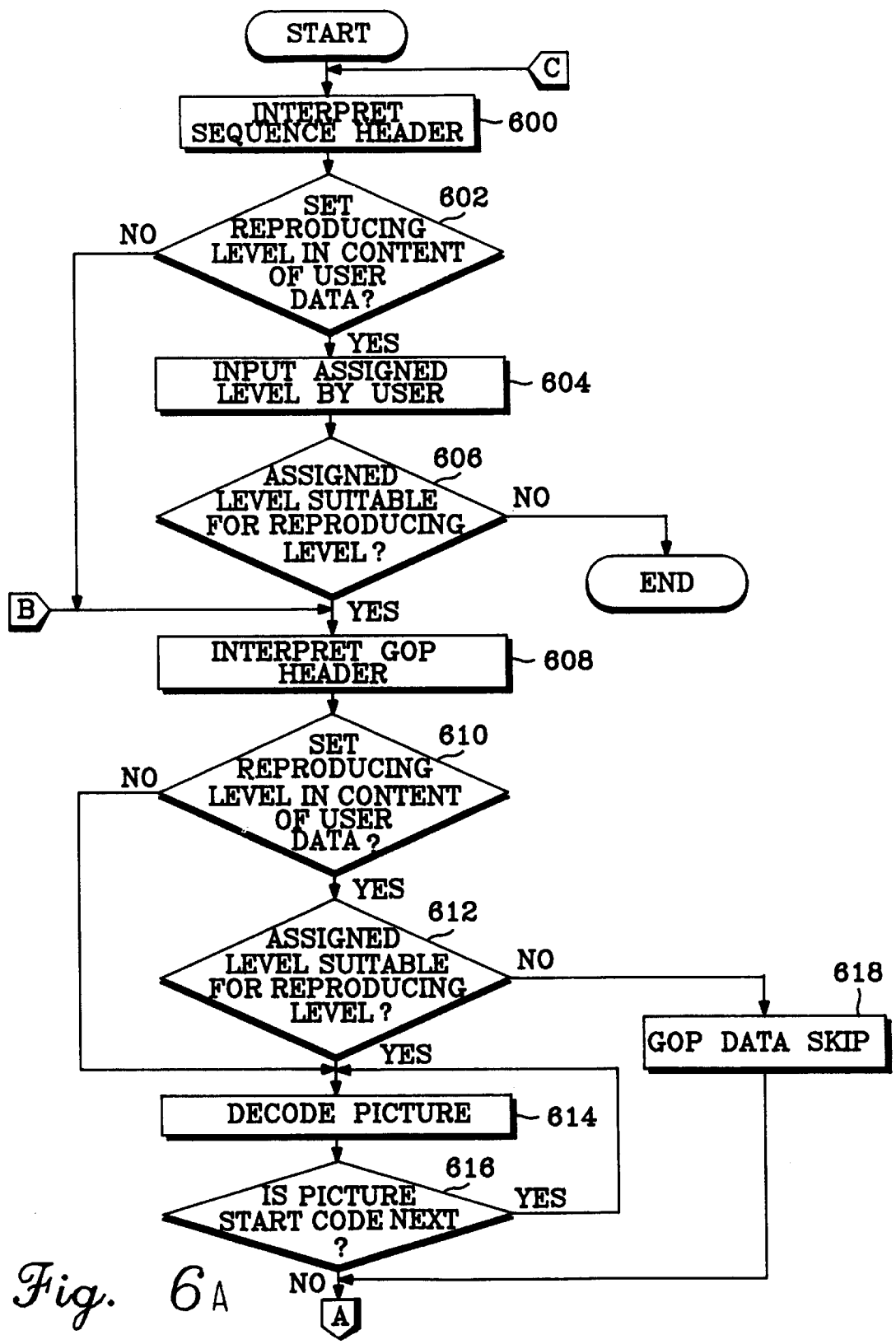
FIGS. 6A and 6B taken together show a flow chart for explaining the decoding of MPEG video data according to the present invention.
Figure 6B:
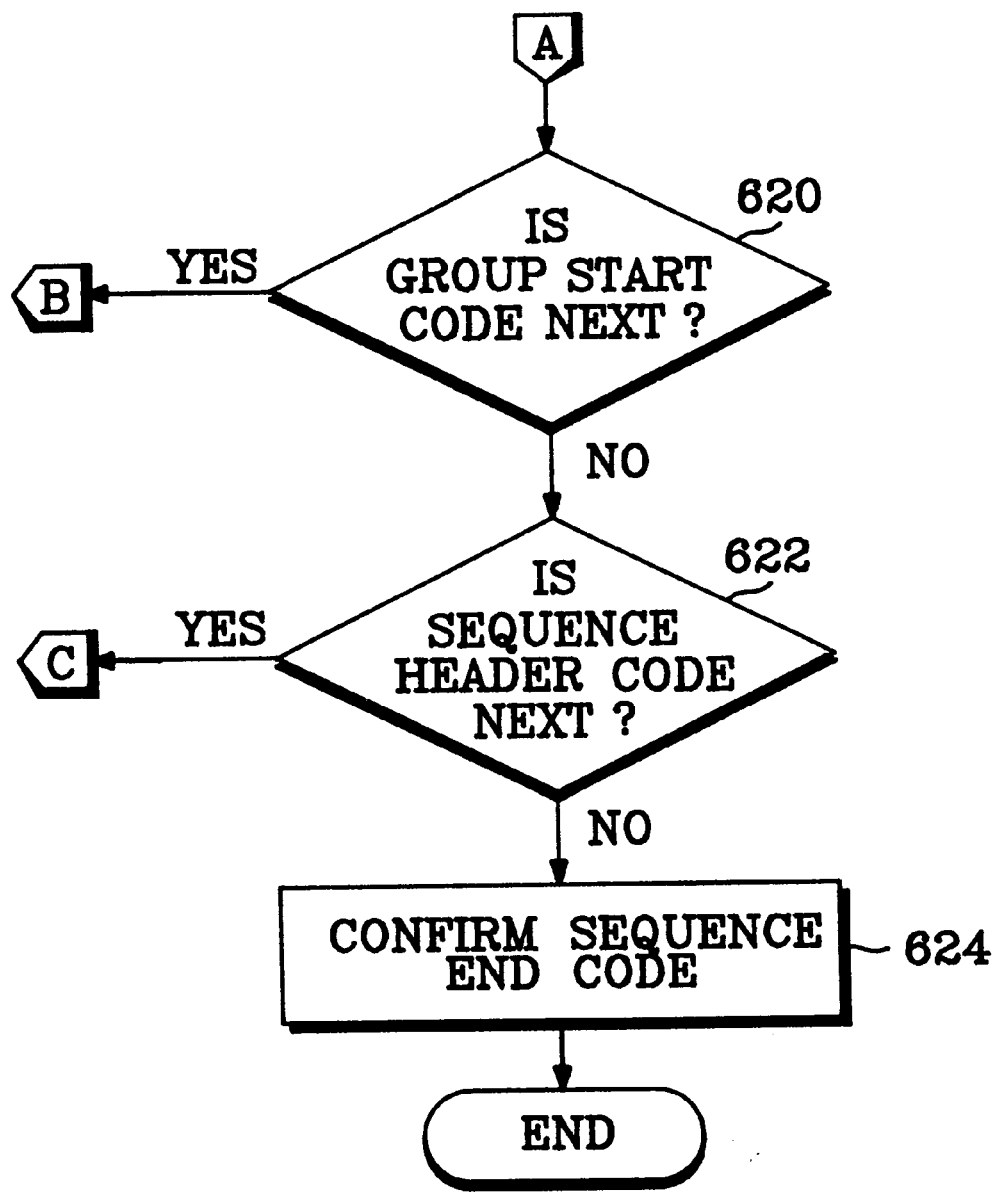

In detail, the MPU 314 of FIG. 3 obtains necessary information for interpreting a sequence header which is the first data of a video sequence in a step 600 of FIG. 6. In a step 602, it is checked whether the reproducing level is set in the user data, i.e., whether reproducing level information is present. At this time, the MPU 314 confirms the user data ID which indicates the presence of the reproducing level information as shown in FIG. 5. Then, if the ID is correct, which means there is reproducing level information for a unit of the MPEG video data, an assigned level corresponding to the user level and the multiplexing level is input from the user in a step 604. The assigned level input by the user is in put through a key input on an operating panel which is generally included in a MPEG video data reproducing system. Then, in a step 606, the reproducibility of the video data is checked by comparing the assigned level input by the user with encoded reproducing level in the user data proximate to the sequence header as explained above. In an exemplary case, the video data is determined to be suitable for reproduction when the user level of the encoded reproducing level is the same as or is the lower than the user level input assigned level, and the multiplexing level of the of the reproducing level is the same as the assigned level or is the lowest of the possible multiplexing levels. If the assigned level does not satisfy the above conditions relative to the reproducing level, the decoding is halted since the entire sequence cannot be reproduced. On the other hand, if the assigned level is suitable for the reproducing level, the next step of decoding of the GOP unit starts in a step 608. When no user data is present in the step 602, the step 608 is performed without the input of an assigned level by a user.

The MPU 314 interprets the GOP header in the step 608, and in step 610, checks whether the reproducing level is set in the user data as described above for the GOP unit. Every GOP should be checked since the reproducing and multiplexing can be controlled based on a GOP unit. If the reproducing level is set in the step 610, it is compared with the assigned level input by the user in the step 604 and then suitability is checked in a step 612. If the assigned level is not suitable for the reproducing level, since the entire corresponding GOP cannot be reproduced, the corresponding GOP is skipped in a step 618 and a step 620 is performed to determine the state of succeeding data. When the assigned level is suitable for the reproducing level, decoding with respect to each picture is performed in the steps 614 through 616.

Figure 4:
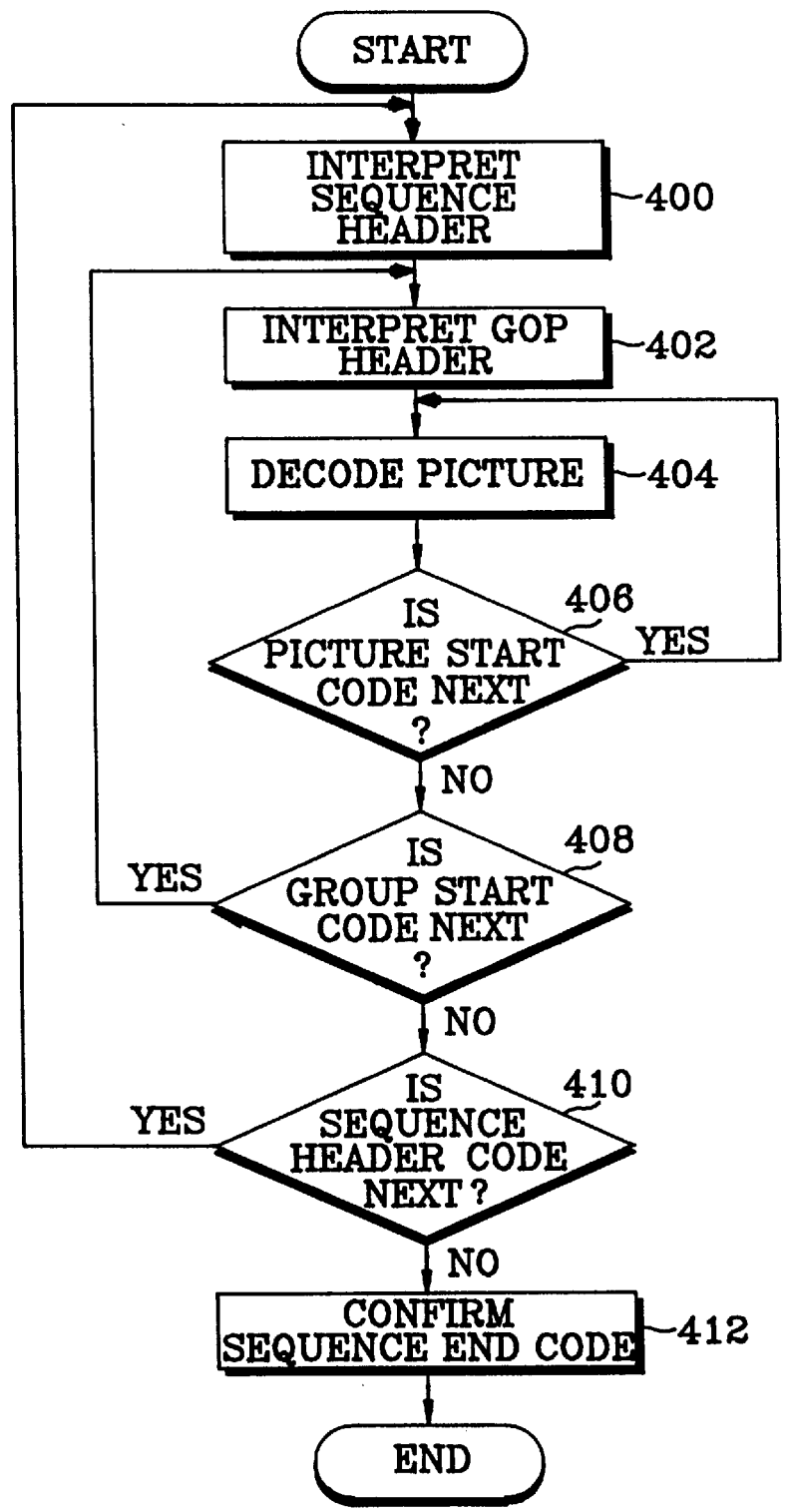
FIG. 4 is a flow chart for explaining the decoding of a conventional MPEG video data.

The decoding of a picture unit is similar to the process listed in FIG. 4 and described above. After decoding a single picture, the MPU 314 confirms whether the next data is a picture start code. If the picture start code follows, the decoding of the picture unit continuously repeats. If not, it is checked whether the next data is the group start code in the step 620. If the group start code is detected, the decoding of the GOP in the steps 608 through 616 as described above continues. When no group start code present, the sequence header may be present. Thus, the presence of the sequence header is checked in a step 622. If the sequence header code follows, the sequence decoding of the steps 600 through 620 as described above repeats. If no sequence header code follows, it is checked whether a sequence end code is generated in a step 624 to end the decoding.

Therefore, by using the user data portion defined by the MPEG specification, the video reproduction may be limited on a portion by portion basis, and it is possible to minimize the increment of data necessary for multiplexing. The additional data amount in implementing the multiplexing by the GOP unit is just 1 byte every sequence unit and GOP unit. Hence, the data amount required for multiplexing can be drastically decreased as compared to the conventional arrangement.

As described above, by adjusting the assigned level with respect to a particular portion of the video data, various reproducing modes based on a user input can be implemented. Further, the multiplexing of the video data can be implemented with a smaller amount of supplemental data compared to the conventional technology. Also, the present invention is compatible for any MPEG decoder since the invention does not deviate from the MPEG specification.

Therefore, it should be understood that the present invention is not limited to the particular embodiment disclosed herein as the best mode contemplated for carrying out the present invention. Rather, the scope of the present invention encompasses the appended claims and obvious variants thereof.

What is claimed is:

1. A method for reproducing compression-encoded video data encoded according to an MPEG (moving picture experts group) specification, said method comprising the steps of:

(a) selecting a user level from a plurality of levels according to kinds of video data for each sequence of video data and group of picture (GOP) units corresponding to each sequence, wherein said user level is capable of being set as user data of corresponding GOP according to the result of said comparing step (f).

2. A reproducing method as claimed in claim 1, wherein said user level is a value for determining the reproduction according to one or more user characteristics.

3. A reproducing method as claimed in claim 2, wherein said assigned level is determined to be suitable for said user level when said user level is the same as.

4. A method for reproducing compression-encoded video data encoded according to an MPEG specification, said method comprising the steps of:

(a) selecting a user level and a multiplexing level from a plurality of levels according to kinds of video data for each sequence of video data and (GOP) a group of picture units corresponding to each sequence, wherein said user level and multiplexing level are capable of being set as a reproducing level for user data of said MPEG specification when the video data is compression-encoded according to said MPEG specification;

(b) checking whether said reproducing level is set in the user data for each sequence in said compression-encoded video data;

(c) comparing said reproducing level with the user level and the multiplexing level of an assigned level which is input by a user when said reproducing level is set in said corresponding sequence, said assigned level corresponding to one of said plurality of levels;

(d) halting decoding when said assigned level is determined to be unsuitable for said reproducing level according to the result of said comparing step (c);

(e) checking whether said reproducing level is set in the user data for each GOP of the corresponding sequence both when said reproducing level is not set in said corresponding sequence and when said assigned level is suitable for the reproducing level of the corresponding sequence;

(f) comparing the reproducing level with said assigned level when said reproducing level is set in a corresponding GOP;

(g) decoding the corresponding GOP both when said reproducing level is not set in the corresponding GOP and when said assigned level is suitable for the reproducing level of the corresponding GOP; and (h) skipping the corresponding GOP without decoding when said assigned level is not suitable for the reproducing level of the corresponding GOP according to the result of said comparing step (f).

5. A reproducing method as claimed in claim 4, wherein said user level is a value for determining reproduction according to one or more user characteristics and said multiplexing level is a value indicating a story change in said compression-encoded video data.

6. A reproducing method as claimed in claim 5, wherein said assigned level is determined to be suitable for said reproducing level when the user level of said reproducing level is the same as or lower than the user level of said assigned level and the multiplexing level of said reproducing level is the same as the assigned level or is the lowest of said plurality of levels.

* * * * *